Figure 1:
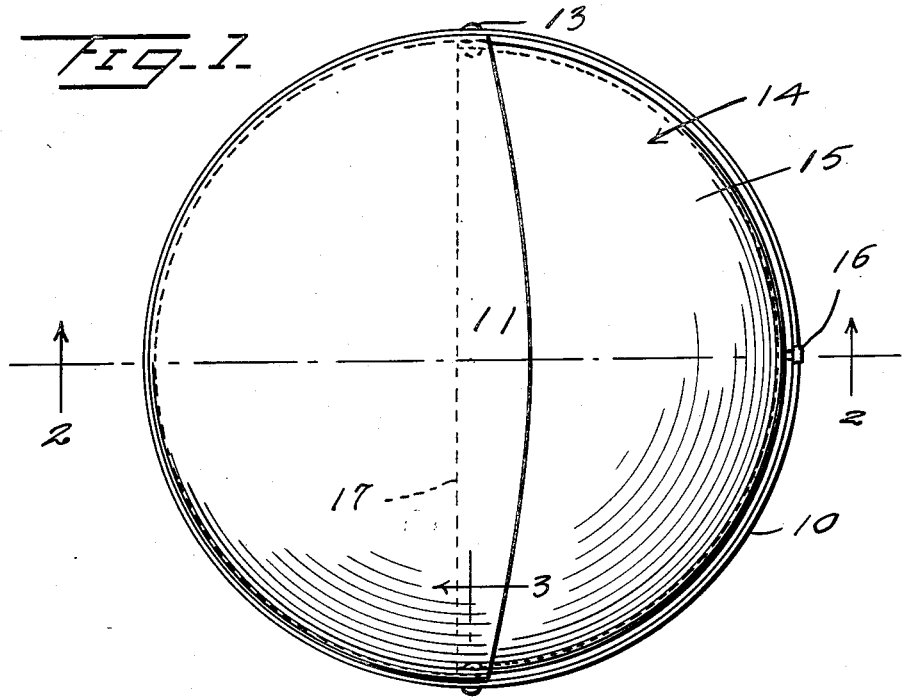

Oct. 21, 1952 — H. K. LOOP — 2,614,718
FRY SHIELD
Filed Sept. 7, 1948

Inventor
H. K. Loop
By Kimmel & Crowell Attys.

Patented Oct. 21, 1952

2,614,718

UNITED STATES PATENT OFFICE 2,614,718

FRY SHIELD

Harvey K. Loop, Astoria, Oreg.

Application September 7, 1948, Serial No. 48,140

1 Claim. (Cl. 220—32)

This invention relates to a shield for mounting in a frying pan to prevent splattering of grease or the like.

An object of this invention is to provide a shield adapted to be placed within a frying pan which will prevent splattering of hot grease and at the same time will afford ventilation for the article being cooked.

In a preferred embodiment of this invention the device consists of a base ring having a parti-globular shield fixed thereto, with a pivoted shield of parti-globular configuration mounted within the open portion of the fixed shield.

With the above and other objects in view, my invention consists in the arrangement, combination and details of construction disclosed in the drawing and specification, and then more particularly pointed out in the appended claim.

Figure 2:
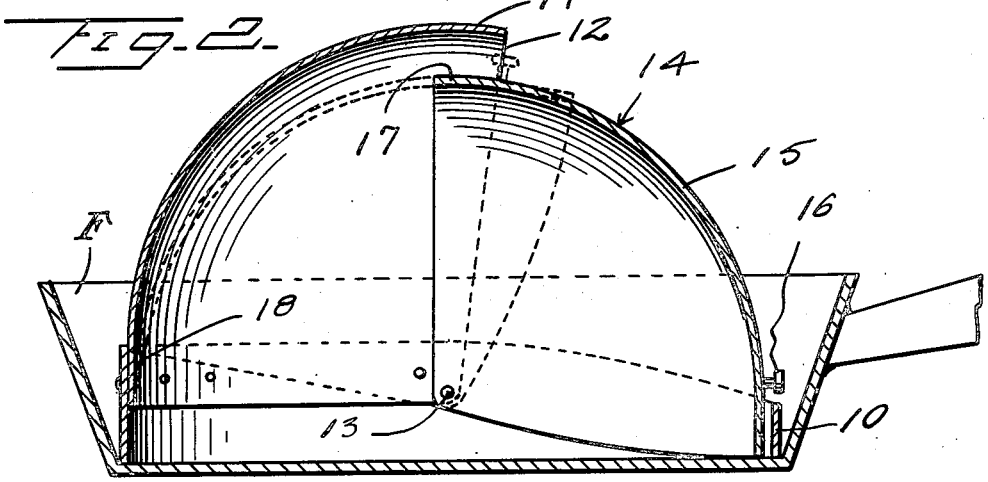
Figure 3:
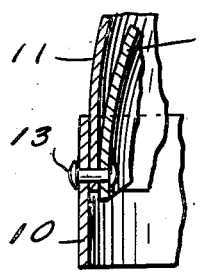

In the drawing,

Figure 1 is a plan view of a grease shield constructed according to an embodiment of this invention, Figure 2 is a sectional view of the shield showing the latter in applied position in a frying pan which is shown in section, taken on line 2—2 of Figure 1, and Figure 3 is a fragmentary sectional view taken on the line 3—3 of Figure 1.

Referring to the drawing the character F designates generally a frying pan within which a shield constructed according to an embodiment of this invention is adapted to be mounted. The shield comprises a circular base ring 10 which is adapted to loosely engage within the frying pan F. The base 10 has fixed thereto a dome-shaped and parti-globular shield member 11. The shield member 11 is of a size slightly greater than one-quarter of a globe so that the forward edge 12 will be disposed forwardly of the center of the shield.

An adjustable and swingable shield member generally designated as 14 is pivotally mounted within the stationary shield 11 and comprises a parti-globular member 15 which is pivotally mounted on pivot means 13 extending through the base 10 and the fixed shield member 11. The adjustable shield 14 has fixed thereto a handle or button 16 which provides a means whereby this shield may be raised or lowered.

The rear portion of the shield 14 as shown in Figure 2, is adapted at its upper portion to be spaced from the shield 12, as indicated at 17, so as to provide a ventilating space in order that vapors may pass out of the shield structure when the adjustable shield member 14 is in lowered shielding position.

In the use and operation of this device, the articles which are being fried are placed in a frying pan F and then the base 10 is disposed in the pan, engaging around the articles. During the frying step the shield member 14 may be swung forwardly and downwardly to the position shown in Figure 2, so that any splattering grease particles will be retained within the shield structure. In the event it is desired during the frying process to turn over the articles, the pivoted shield member 14 may be swung upwardly to the dotted position shown in Figure 2, the rear or inner edge of the shield member 14 abutting against a stop member 18 which is disposed in inwardly projecting position at the rear and lower portion of the fixed shield member 11.

I do not mean to confine myself to the exact details of construction herein disclosed, but claim all variations falling within the purview of the appended claim.

What I claim is:

A grease shield for mounting in a frying pan comprising a vertical circular base flange, a quarter-spherical fixed shield member including a semi-circular rim portion fixedly secured to said base, a movable shield member including a body of more than quarter-spherical configuration and engageable within said fixed shield member, said shield members being of substantially the same radius, and pivot means mounting said movable shield member on said base flange within said fixed member, the pivotal axis of said pivot means passing through the center of curvature of said movable shield member and being vertically spaced below and inwardly from a line passing through the center of curvature of said fixed shield and parallel to said axis whereby said shield members form a substantially semi-spherical shield when extended relative to each other, the adjacent edges thereof overlapping and substantially spaced from each other at the top portion for venting the interior, the innermost edge of said movable member engaging the inner surface of said fixed member for limiting the inward movement of said movable member.

HARVEY K. LOOP.

REFERENCES CITED

The following references are of record in the file of this patent:

UNITED STATES PATENTS

| Number | Name | Date |
|---|---|---|
| 1,680,962 | Voshardt | Aug. 14, 1928 |
| 1,722,513 | Witter | July 30, 1929 |
| 2,428,839 | Di Salina | Oct. 14, 1947 |

FOREIGN PATENTS

| Number | Country | Date |
|---|---|---|
| 1,200 | Great Britain | Jan. 18, 1909 |
| 17,952 | Germany | May 16, 1882 |
| 24,391 | Great Britain | Nov. 7, 1902 |
| 25,606 | Great Britain | Nov. 19, 1907 |
| 229,511 | Great Britain | Feb. 26, 1925 |
| 595,503 | Great Britain | Dec. 8, 1947 |